United States Patent [19]

Newman et al.

[11] Patent Number: 5,653,883

[45] Date of Patent: Aug. 5, 1997

[54] STIRRED TANK BIOLOGICAL ACTIVATED CARBON ADSORPTION-DESORPTION PROCESS

[76] Inventors: William A. Newman, 5421 Landmark Cir., Mounds View, Minn. 55112; Ritchey O. Newman, 5211 Lake Dr., Gladwin, Mich. 48624

[21] Appl. No.: 578,174

[22] Filed: Dec. 29, 1995

Related U.S. Application Data

[63] Continuation-in-part of Ser. No. 212,717, Mar. 14, 1994, abandoned.

[51] Int. Cl.[6] ............................................. C02F 3/08
[52] U.S. Cl. ..................... 210/617; 210/618; 210/908; 210/909
[58] Field of Search .................... 210/616–618, 210/908, 909

[56] References Cited

U.S. PATENT DOCUMENTS

| | | | |
|---|---|---|---|
| 5,057,221 | 10/1991 | Bryant et al. | 210/617 |
| 5,062,958 | 11/1991 | Bateson et al. | 210/617 |
| 5,217,616 | 6/1993 | Sanyal et al. | 210/617 |

Primary Examiner—Thomas G. Wyse
Attorney, Agent, or Firm—Merlin B. Davey

[57] ABSTRACT

Organic contaminants are removed from water by microbial biodegradation in a stirred tank system having a powdered or granular media for biofilm support. A stirring impeller maintains the media suspension, provides a shear force to remove excess biomass from media particles and is adjustable to provide an optimal biofilm thickness.

12 Claims, 1 Drawing Sheet

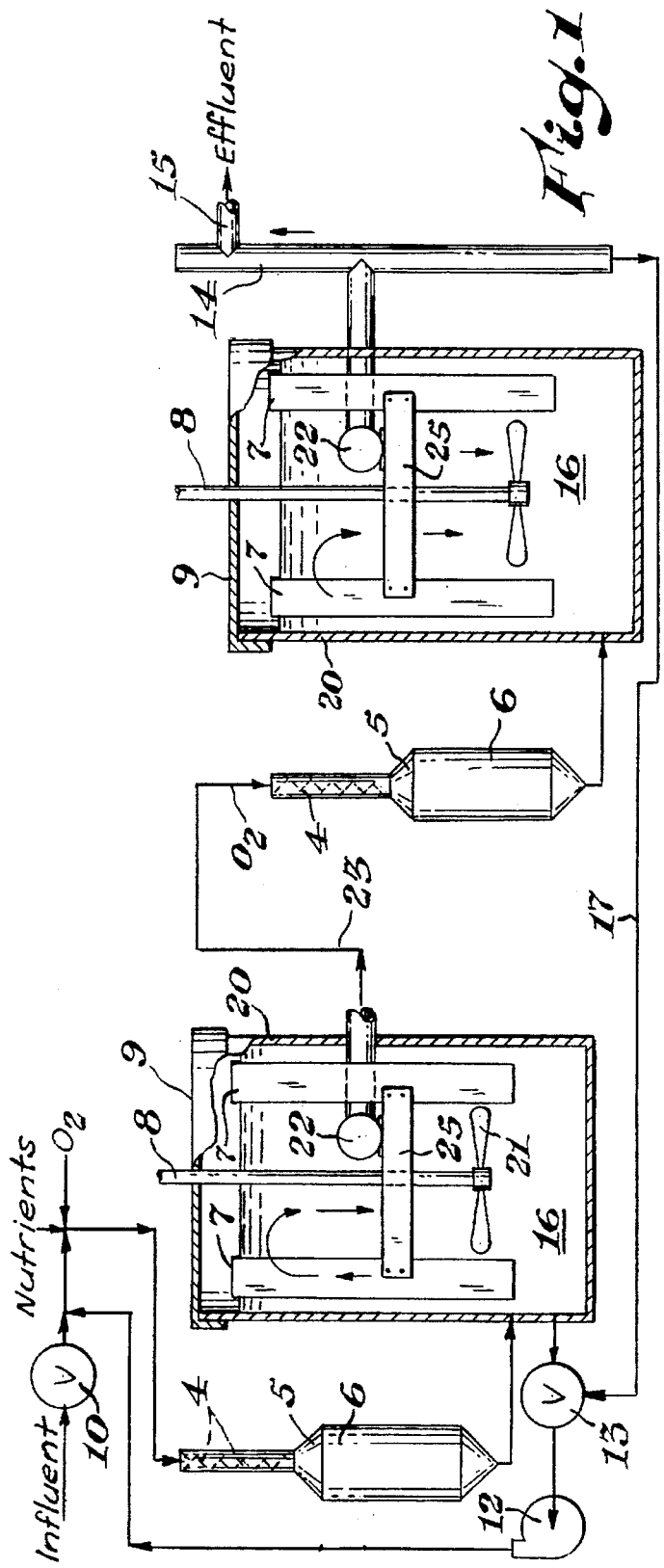
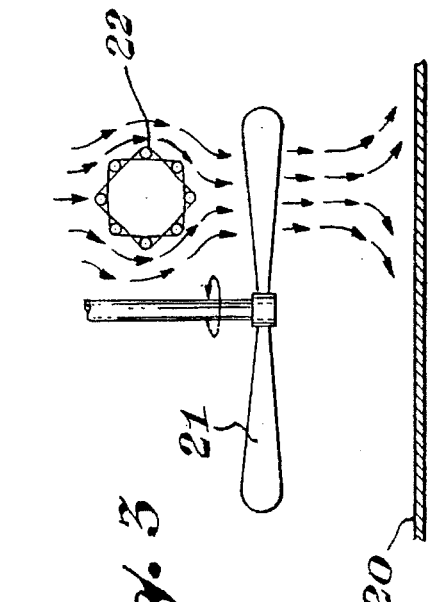
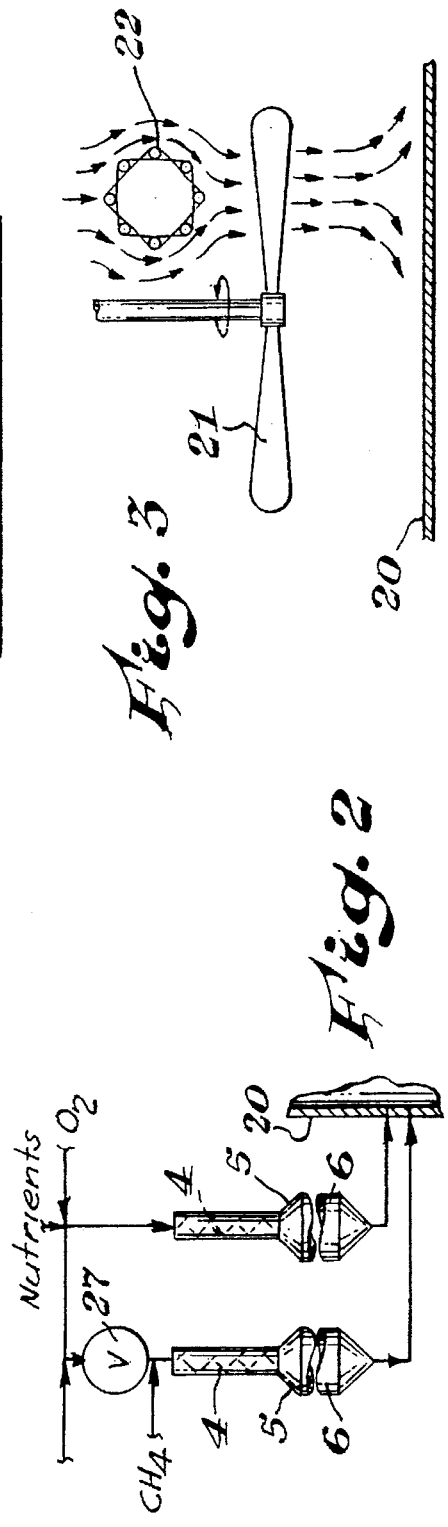

STIRRED TANK BIOLOGICAL ACTIVATED CARBON ADSORPTION-DESORPTION PROCESS

CROSS-REFERENCE TO RELATED APPLICATIONS

This application is a continuation-in-part of application Ser. No. 08/212,717 filed Mar. 14, 1994, now abandoned.

BACKGROUND OF THE INVENTION

As described in "Adsorption Processes for Water Treatment" by Faust and Aly, 1987, p. 370, "Groundwater represents greater than 95% of available fresh water in the United States, and this includes the Great Lakes. About 80% of all public water supplies rely on groundwater for portable water sources, and approximately 96% of all water employed for rural domestic purposes is obtained from groundwater. Usage of groundwater by public water utilities has almost tripled since 1950 from 3.5 bgd to 11 bgd in 1975. Concurrently, more and more contamination of these groundwaters by organic compounds has been reported (Table 8–18)."

The above problem is made more difficult because most current treatment methods involve a mass transfer of the organic contaminants from the water to be treated into an air stream. "Air Stripping" is the least expensive and most widely used of these processes. The contaminated air must then be released into the atmosphere or treated separately. As air pollution levels rise, Federal, State and Local air quality regulations have become more stringent and "air stripping" without air treatment is less common.

The limits of groundwater and atmospheric tolerance for pollution requires an improved process that can more economically and effectively treat contaminated water before it becomes part of the groundwater resource and to improve the treatment of contaminated water, regardless of source, before industrial or domestic use.

Many of the common organic pollutants found in contaminated water situations are subject to biological degradation into compounds that are harmless. Many organic compounds can be adsorbed on activated carbon and thus removed from water. A great number of these organic compounds are both biodegradable and adsorbable. When feasible, the biological process provides a natural method, breaking down many compounds to carbon dioxide, water, inorganic salts, and biomass. Use of carbon and activated carbon to remove odors, unwanted colors, and pollutants from water goes back about 4,000 years. There are several activated carbon adsorption processes but all suffer from the high cost of replacing or thermally regenerating the carbon at regular intervals.

Research on the growth of bacteria indicates that in low concentrations of the organic substrate, bacterial growth is favored by attachment to solid surfaces. In fact, attached bacteria will grow at organic concentrations lower than those that will support growth in the free or unattached state. This is extremely important in a biodegradation situation because the goal is to get the organic concentration in the final effluent as low as possible—preferably by biological means.

In situations where high concentrations of an organic contaminant, such as phenol, are toxic to bacteria, activated carbon can adsorb the phenol and lower the concentration to a level the bacteria can assimilate. By adding nutrients and oxygen over a period of time, the phenol can be gradually released or desorbed from the carbon and biodegraded by the bacteria attached to the carbon particles. This phenomena has been described as "Substrate-Inhibited Microbiological Regeneration of Granular Activated Carbon". Sigurdson and Robinson, The Canadian Journal of Chemical Engineering, 56, Jun. 1978, pp. 330–339. When first starting up, the carbon particles can often adsorb the organic contaminants and provide treatment while the bacterial population adapts and builds up to the maximum biodegradation contribution.

SUMMARY OF THE INVENTION

The primary object of the invention is to provide a relatively inexpensive continuous process and an apparatus for removing dissolved organic contaminants from air and water by microbial biodegradation. It is another object of the invention to provide a process and apparatus for removing dissolved organic contaminants by employing a powdered or granular media for biofilm support, and a stirred tank system to suspend the media and its biofilm coating. It is a further object of the invention to control the thickness of the biofilm coating by adjusting the speed of the stirring impeller to produce the appropriate shear forces.

It is a still further object of the invention to provide a separate side stream oxygenation of the influent, independent of the mixing process.

The term, "stirred reactor", refers to a tank impeller and a baffle system that circulates liquid at a velocity sufficiently high to suspend granular or powdered media and produce a uniform suspension of media. Unlike a fluidized bed system, loss of media will not occur when biomass accumulation enlarges particle sizes. However, excessively thick biofilms are not as efficient as a relatively thin biofilm due to diffusion limitations. The stirring impeller, in addition to maintaining the media suspension, provides a shear force to remove excess biomass from media particles. Impeller speed may be adjusted to produce an optimal biofilm thickness.

Employing suspended media in a stirred reactor allows waste water containing substantial amounts of suspended matter to be treated. Static packed bed reactors are subject to fouling and excessive pressure losses caused by retention of solids, excess biomass, and metal hydroxide or carbonate precipitates.

The combination of an attached biofilm on media, a high specific surface area, and liquid mixing result in high rates of biodegradation (mineralization) similar to fluidized bed reactors. The stirred tank suspended media system allows effective treatment with small reactor volumes, without the control complexities of a fluidized bed reactor.

DESCRIPTION OF THE DRAWINGS

FIG. 1 is a diagrammatic view of a treatment unit in accordance with the present invention;

FIG. 2 illustrates the addition of a cosubstrate to the first tank shown in FIG. 1; and FIG. 3 illustrates the flow from the impeller around the filter when the filter is positioned above the impeller blades.

DETAILED DESCRIPTION OF THE INVENTION

Referring to the drawings, in FIG. 1 two stirred tank reactors are shown in series, each unit consisting of a tank 20, containing a biofilm support media slurry 16. Flow within the tank is controlled by vertical baffles 7—two shown, three or more provided—and driven by variable speed impeller 21, attached to shaft 8 and powered by a means not shown. The impeller design is chosen to provide a reasonably uniform downward flow velocity in the area swept by the impeller. Flow then is upward near the tank walls and, by use of the baffle design, a strong circulation pattern is maintained in the tank. The impeller position, speed and geometry are chosen to provide the necessary circulation and provide enough shear force to prevent an excessively thick biofilm buildup on the supporting media particles.

Contaminated water or influent rate is controlled by valve 10. Oxygen and nutrients for optimum biological growth may be added prior to a vertically downward mixing section 4. The size and geometry of this mixer are chosen to allow the entrained oxygen bubbles to pass through the mixer and then, preferably, through an increasing diameter transition section 5 and into a section 6 in which the slower downward fluid flow rate can not sweep any undissolved gas bubbles through into the tank 20. Other geometries may be employed if desired as long as the side stream oxygenation design avoids the possible rising through the media slurry 16 of undissolved gas bubbles and resulting air pollution. This action is enhanced by additional fluid flow provided by pump 12. Pump 12 draws media slurry from tank 20, through a three-way valve 13, and adds it to the influent from valve 10. This insures optimum oxygenation and nutrient mixing for media slurry 16 during its residence time in the first tank.

Another option, useful for keeping a large biological population available for use on short notice when the unit is not on stream, is to close valve 10, set valve 13 to direct flow from effluent standpipe 14, through conduit 17 to pump 12 and hence through the mixing and oxygenation step. To anticipate specific organic contaminants or substrates, an appropriate concentration of the target material could be fed along with required nutrients.

Tank 20 is provided with a cover 9 and an exit filter 22 situated on baffle support 25. A cross-section of the filter 22 and impeller 21 location is shown in FIG. 3. Exit filter 22 is, advantageously, cylindrical, relatively large in size, and positioned near the impeller shaft 8 so the flow of water and media particles produced by the impeller 21, will minimize accumulation and plugging on the filter surface. Filter openings are sized to retain the media support particles, but allow water and unattached biomass to pass. The biofilm coating mineralizes organic contaminants to form carbon dioxide and water, thus not forming any sludge. If halogens, such as chlorine, are present, the effluent can be treated with a base to neutralize any acids formed. The biofilm coated adsorbing media is retained in the system and does not have to be removed, replaced and/or regenerated as is now common in the art.

The flow from the first tank to the second is desirably by gravity through conduit 23 with more oxygen added prior to another mixer 4, and so on. In the final tank 20, the effluent leaves through filter 22 and into standpipe 14 before exiting through a discharge pipe 15. Throughput rate is controlled by valve 10.

FIG. 2 illustrates the addition of a cosubstrate to the first tank of the process shown in FIG. 1. Part of the influent is diverted through a check valve 27 and then through a side stream mixer unit 4, through a transition section 5, and a larger diameter section 6, before entering the tank 20. As in the case of the oxygen side stream mixing section, the goal is to avoid undissolved gas bubbles rising through the media slurry 16 and, possibly, polluting the atmosphere. A second unit may be incorporated to add more cosubstrate between the first and second tank, a second and third tank, and so on, in a similar manner. For safety reasons, oxygen and methane must be added separately.

While a variable velocity bubble trap is illustrated in the drawings, similar results may be achieved by other known art such as, for example, packed chambers and gas transfer membrane fibers.

The cosubstrate shown, methane, can be economically provided for most uses as natural gas. For remote locations propane may be substituted as a cosubstrate and supplied from liquid propane tanks. This cosubstrate can enhance the biodegradation of difficult compounds, such as trichlorethylene, in specific applications and is an important feature of this invention.

DESCRIPTION OF PREFERRED EMBODIMENTS

The stirred tank reactor system advantageously comprises two or more cylindrical tanks containing a suspended powdered or granular media. Suitable media material can consist of natural or artificial materials such as sand, glass beads, plastic powder or granules, such as, for example, polyethylene, polystyrene and polypropylene powder or, diatomaceous earth, alumina, and powdered (largely below 200 mesh) or granular (typically about 8 to about 40 mesh) activated carbon. The adjustment of the impeller speed and water velocities allows for the suspension of a wide range of particle sizes and particle specific gravities.

The reactor may be seeded with the appropriate microbial culture or allowed to accumulate a biofilm of microbes that occur naturally in the water to be treated. A period of two to four weeks is often required to accumulate enough active microbial biomass for effective treatment. The use of adsorptive media, such as activated carbon, may allow effective treatment during the acclimatization and initial growth period.

The mixing impeller should desirably create axial fluid velocities of 0.5–5 feet per second. The flow is directed downward at and around the outlet screen to control buildup of solids on the outlet filter. The circulation pattern of the liquid and suspended media is downward at the tank center and upward at the tank annulus near the wall. The velocities and distribution of media and liquid circulation are dependent on tank, baffle, and impeller dimensions and geometry.

The impeller is advantageously mounted in the center of the tank with the same vertical axis as the tank. The impeller geometry desirably produces uniform axial flow velocities across the entire cross-section of impeller rotation. To improve vertical media and fluid circulation, the tank is desirably equipped with three or more radially mounted internal baffles, with a width of $\frac{1}{10}$ to $\frac{1}{12}$ of the tank diameter, and extending from the bottom of the tank to nearly the full tank height. To minimize accumulations and provide for ease of tank maintenance and cleaning, the baffles are desirably mounted with a gap of about one-half of their width from the tank wall. The impeller speed may be adjusted by known art to compensate for changes in media size and specific gravities. Adjusting the impeller velocity also allows for control of the biofilm thickness of the suspended media. A biofilm thickness of approximately 100 microns is advantageously maintained for maximum biological removal rates.

Optimal pH will vary depending on the microbial process and waste, but a pH ranging from 5 to 9 is required for most microbial processes, and 6.5 to 8.5 is optimal for most bacterial systems. Temperatures ranging from 5 degrees C. to 50 degrees C. may be used, but optimal results for most microbial systems are obtained from 15 degrees C. to 35 degrees C.

With the exception of microbial systems that utilize a cosubstrate, the organic waste stream is the primary source of energy and carbon. Addition of macro-nutrients such as nitrogen and phosphorus may be required and, in unusual cases, micronutrients or trace elements may be needed. The rates of inorganic nutrient addition may be based on standard wastewater C/N/P rates, but, in many cases, addition of amendments will be limited by the residual concentrations allowed in the effluent.

Biodegradation rates for Stirred Suspended Media Reactors are not available for most compounds in scientific literature. However, fluidized-bed reactor test results are available and these should provide a reasonable approximation of the performance to be expected from a Stirred Suspended Media Reactor.

The following examples further illustrate the invention:

EXAMPLE 1

Benzene, Toluene, Ethylbenzene, and Xylene (BTEX) Removal

Influent—5.4 mg/liter of mixed BTEX feed.

Temperature—16 degrees C.

Amendments of N & P to produce 100/5/1 ratio of COD/N/P*

Hydraulic Retention Time of 5 minutes.

Removal of 98.8%.

*(Chemical Oxygen Demand/Nitrogen/Phosphorus)

The reactor illustrated in FIG. 1 consists of two 400 gallon tanks in series for an empty bed volume of approximately 3,000 liters. When filled with 50% by volume of granular activated carbon, the hydraulic retention volume would be about 1800 liters. At an influent flow of 100 liters (26 gallons) per minute, the hydraulic residence time is approximately 18 minutes.

The example reactor is capable of continuously removing 19.26 mg/liter of BTEX at an influent rate of 100 liters/minute.

EXAMPLE 2

Phenol Removal

Influent—500 mg/liter.

Temperature—20 degrees C.

Amendments—as in Example 1.

Removal Rate—7.5 g/liter-day.

Using the reactor of Example 1 and a comparable rate of 7.5 g/liter-day and a 3,000 liter empty reactor volume, the daily removal mass is given by 7.5 g/liter-day (3,000 liters) =22,500 g phenol/day.

A 100 liter/minute flow gives 100(24)(60)=144,000 liters/day.

At the above rates, an influent concentration equivalent to 22,500 g (1,000 mg/g)/144,000 liters=156 mg/liter is continuously effectively treated.

EXAMPLE 3

Methylene Chloride Removal

Employing a reactor as in Example 1 and an influent rate of 10.2 g/liter, a temperature of 30° C. and a pH of about 7.0 (maintained with NaOH & pH controller) a removal rate of 1.6 g/liter-hour is obtained.

The example stirred tank reactor as described in Example 1 and FIG. 1 has an empty bed volume of approximately 3,000 liters.

Therefore, at 1.6 g/liter-hour, the 3,000 liter reactor continuously removes up to 1.6 g/liter-hour (3,000 liters)=4,800 g/hour of Methylene Chloride.

EXAMPLE 4

Replacement and disposal of GAC (granular activated carbon) is a major expense in GAC adsorption water treatment systems. In contrast a bioreactor that utilizes GAC as a support media for microbial growth does not require GAC replacement or disposal with the exception of minor losses by physical attrition. In the suspended media fixed film bioreactor biodegradable contaminants are mineralized to water, carbon dioxide and microbial biomass, such that the adsorption capacity of the GAC is continually renewed. In a GAC adsorption treatment system the contaminants are retained on the GAC until the adsorptive capacity of the carbon is reached and the GAC media is no longer effective in removing the target contaminant. The spent media requires replacement and either disposal or high temperature regeneration in an off site treatment facility. The following example illustrates the substantial GAC replacement costs associated with even a relatively small GAC adsorption water treatment system.

30 gallons per minute (gpm) or 114 liters per minute (LPM)

Contaminant: benzene at 5 milligrams per liter (mg/l)

GAC Adsorptive capacity 80 milligrams per gram (mg/g) (Nyer 1985)

GAC Replacement/Disposal Costs $2.50/pound or $5.51/kilogram (Yudelson 1995)

114 LPM×5 mg/L benzene×1440 min/day=$8.208 \times 10^5$ mg benzene/day $$\frac{8.208 \times 10^5 \text{ mg benzene/day}}{80 \text{ mg benzene/g } GAC} = 10{,}260 \text{ g } GAC/\text{day consumed}$$

10,260 g GAC/day × kg/1000 g × 5.51/kg GAC = 56.53/day carbon replacement and disposal costs or $20,634/year As indicated in the above example, a suspended media fixed film GAC bioreactor has the potential to save $20,634 per year in GAC costs.

EXAMPLE 5

In a further example, phenol contaminated air is passed through a spray chamber scrubber where it is scrubbed with a slurry of powdered activated carbon or powdered activated carbon and water. The slurry is continuously recirculated through a stirred tank reactor system in accordance with this invention where the activated carbon slurry is regenerated. Since the slurry is 100% recycled, separation of media and water is not needed and a fine powdered media may be used without the need of filtration or other separation. A stirred two tank reactor with 3,000 liters of slurry volume is capable of continuously removing 22,500 grams of phenol per day. With a phenol mass input of 1,000 ppm by volume (4.2 mg/liter of air) the reactor has the capacity to remove 100% of the phenol mass input.

EXAMPLE 6

The following example will illustrate the costs associated with GAC replacement and disposal in an air treatment system used to treat gasoline vapors produced from a Soil Vapor Extraction remediation system.

A single 1000 #GAC adsorption vessel

Air Flow 100 standard cubic feet per minute (scfm)

Contaminant: Gasoline vapors: loading rate 25 pounds per day

GAC adsorptive capacity 0.3 pounds/pound GAC (#/#GAC)(Yudelson 1995)

GAC replacement cost $2.50/# (Yudelson 1995)

25 # gasoline/day×# GAC/0.3 # gasoline=83 # GAC/day 83.3 # GAC/day×$2.50/#GAC =$208.33/day or $76,042/year As indicated in the above example the suspended media bioreactor coupled with an adsorption spray chamber has the potential to save up to $76,042/year in GAC replacement and disposal costs.

Similar results are obtained when processing air contaminated with other organics such as, for example, paint and coating solvents and the cleaning of air streams from other air-stripping operations.

The process of this invention avoids the release of organic contaminants into the atmosphere and offers great flexibility in treating various contaminated water streams with a portable, standardized unit that can be kept available for application on short notice in case of a spill or pollution containment situation.

The process design offers significant savings in capital and operating costs over traditional methods. The process provides a combined biological-degradation and adsorption-desorption method, using activated carbon, to deal with a wide variety of pollution problems.

This invention combines biodegradation and activated carbon adsorption in a way that maximizes the best features of both processes. Carbon life is greatly extended since adsorption capacity is primarily consumed by organic compounds that adsorb but don't degrade. Biodegradation is enhanced when otherwise toxic compounds are adsorbed by the carbon.

The process and apparatus of this invention provide a situation in which both adsorption and biodegradation processes can work effectively in a wide variety of application situations.

The traditional "site-specific" approach to groundwater cleanup or pollution control is not the most appropriate one. If design and selection of equipment must wait for an analysis of the specific site, containment of a spill or other emergency action is delayed. Costs are increased not only due to unnecessary design effort, but also due to contaminant migration increasing the volume of contaminated groundwater. A common rule of thumb in designing special equipment is that design costs are at least equal to equipment construction costs—in effect, doubling the cost of the cleanup equipment and delaying its application to the problem at hand. A great majority of contamination situations involve combinations of hydrocarbons with well-known properties and the intent of this invention is to provide off-the-shelf portable units that can deal with all but very unusual cleanup situations in a prompt and economical manner.

With slight modification, these units can be used to treat and recirculate scrubbing water for air cleanup units employing wet scrubbing methods. By including powdered activated carbon or PAC in the scrubbing liquid, adsorption of organic contaminants from the air stream is enhanced for nonpolar solvents with a low solubility in water. The slurry can now be treated or regenerated by the improved process.

The alternative methods usually employ burners, catalytic or otherwide, which are expensive and consume expensive fuel, or containers of dry granular activated carbon or GAC to adsorb organic contaminants, which must be replaced or thermally regenerated frequently.

The source of treatment water contaminated by organics can include hydrocarbons from industrial process water, bulk facility storage tank bottom water, water from pipelines, or contaminated surface or groundwater; common polar industrial solvents such as methylethylketone, acetone, or methylisobutylketone, removal of groundwater contaminants associated with wood treating wastes including pentachlorophenol, and polynuclear aromatic hydrocarbons and halogenated and non-halogenated industrial solvents.

Unlike reactors using aeration for oxygen transfer, the stirred tank does not produce a polluted air stream when treating volatile organics. The process is not limited to simple aerobic systems, and may be used for anoxic, anaerobic, or more complex biological processes requiring a cosubstrate to remove the target contaminants.

In addition to water treatment, the process and apparatus of this invention may be coupled with a water or powdered carbon wet-scrubbing process to treat air contaminated with organics and may be used to continuously generate a clean scrubbing fluid in a closed loop without discharge to waste.

A major potential advantage of the activated carbon slurry/air scrubbing system is the load leveling effect. Most paint or coating line systems operate for a small part of the 24-hour day, but the catalytic burner or other systems have to be sized to handle the maximum contaminant load while operating. With the slurry adsorption/desorption system, of this invention, the organics can be adsorbed in the media particles during operation and desorbed both while operating and while idle in the stirred tank reactor.

Various modifications may be made in the present invention without departing from the spirit or scope thereof as will be readily apparent to those skilled in the art.

We claim:

1. A continuous process for removing dissolved organic contaminants from waste water by microbial biodegradation comprising passing said organic contaminated water through a stirred tank reactor system comprising a variable speed impeller and baffles and containing suspended particulate media that is coated with a biofilm, the thickness of said biofilm being controlled by adjusting the speed of said impeller, said biofilm mineralizing said organic contaminants to form carbon dioxide, water, and microbial biomass.

2. Process of claim 1 wherein effluent from said stirred tank reactor system is passed through a filter that retains said suspended particulate media, allowing water and biomass that is not coated on said particulate media to pass.

3. Process of claim 2 wherein said biofilm is maintained at a thickness such as to provide a high diffusion rate to optimize mineralization.

4. Process of claim 1 wherein the suspended particulate media comprises at least one member of the group consisting of powdered activated carbon, granular activated carbon, sand, alumina, plastic powders and plastic pellets.

5. Process of claim 4 wherein the suspended particulate media comprises a member of the group consisting of high density polyethylene, powdered polypropylene and pelleted polypropylene.

6. Process of claim 2 wherein the organic contaminants comprise at least one member of the group consisting of unsubstituted hydrocarbons from the industrial process water, bulk facility storage tank bottom water, water from pipelines, contaminated surface water, contaminated groundwater, common polar industrial solvents, alcohols, methylethyl ketone, acetone, methylisobutyl-ketone, contaminants from wood treating wastes, phenol, pentachlorophenol, polynuclear aromatic hydrocarbons, and creosote and halogenated and nonhalogenated industrial solvents.

7. Process of claim 6 wherein the organic contaminants are unsubstituted hydrocarbons.

8. Process of claim 7 wherein the organic contaminants comprise at least one member of the group consisting of benzene, toluene, ethyl benzene and xylenes.

9. Process of claim 6 wherein the organic contaminants comprise at least one member of the group consisting of alcohols and ketones.

10. Process of claim 6 wherein the organic contaminants comprise pentachlorophenol.

11. Process of claim 1 wherein the waste water is obtained from a slurry formed by passing organic-contaminated air through at least one spray chamber scrubber, forming a slurry that is thereafter passed through the stirred tank reactor.

12. Process of claim 11 wherein the waste water slurry comprises powdered activated carbon and organic contaminants adsorbed thereon.

* * * * *